United States Patent
Nishida

(10) Patent No.: US 8,445,863 B2
(45) Date of Patent: May 21, 2013

(54) ION GENERATION METHOD, ION GENERATION APPARATUS, AND ELECTRIC EQUIPMENT USING THE SAME

(75) Inventor: Hiromu Nishida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/378,966

(22) PCT Filed: May 21, 2010

(86) PCT No.: PCT/JP2010/058616
§ 371 (c)(1),
(2), (4) Date: Dec. 16, 2011

(87) PCT Pub. No.: WO2010/146966
PCT Pub. Date: Dec. 23, 2010

(65) Prior Publication Data
US 2012/0085921 A1  Apr. 12, 2012

(30) Foreign Application Priority Data

Jun. 19, 2009  (JP) .................................. 2009-146552

(51) Int. Cl.
*H01T 23/00* (2006.01)
(52) U.S. Cl.
USPC ..... 250/424; 250/324; 250/423 R; 250/423 F
(58) Field of Classification Search
USPC ............. 250/324, 423 R, 424, 425, 426, 427, 250/423 P, 423 F
See application file for complete search history.

(56) References Cited

U.S. PATENT DOCUMENTS

| | | | | |
|---|---|---|---|---|
| 4,643,745 | A | * | 2/1987 | Sakakibara et al. ............. 96/76 |
| 2007/0236856 | A1 | * | 10/2007 | Kato et al. .................... 361/230 |
| 2009/0140164 | A1 | | 6/2009 | Sekoguchi et al. |
| 2011/0150710 | A1 | * | 6/2011 | Tsuda et al. .................. 422/120 |

FOREIGN PATENT DOCUMENTS

| | | | |
|---|---|---|---|
| JP | 60251944 A | * | 12/1985 |
| JP | 2007-258073 A | | 10/2007 |
| JP | 2007258073 A | * | 10/2007 |
| JP | 2007-305321 A | | 11/2007 |
| JP | 2007-305417 A | | 11/2007 |
| JP | 2008-210817 A | | 9/2008 |

* cited by examiner

*Primary Examiner* — Michael Logie
(74) *Attorney, Agent, or Firm* — Birch, Stewart, Kolasch & Birch, LLP

(57) ABSTRACT

An air cleaner includes a negative ion generation portion generating negative ions, a positive ion generation portion generating positive ions, a drive portion adjusting a distance between the ion generation portions, a wind velocity sensor detecting wind velocity at positions where the ion generation portions are installed, and a microcomputer controlling the drive portion based on a detection result of the wind velocity sensor and setting distance D between the ion generation portions to an optimal value. Therefore, since the distance between the ion generation portions is set to the optimal value, a large amount of ion generation can be obtained.

16 Claims, 14 Drawing Sheets

FIG.1
(a)
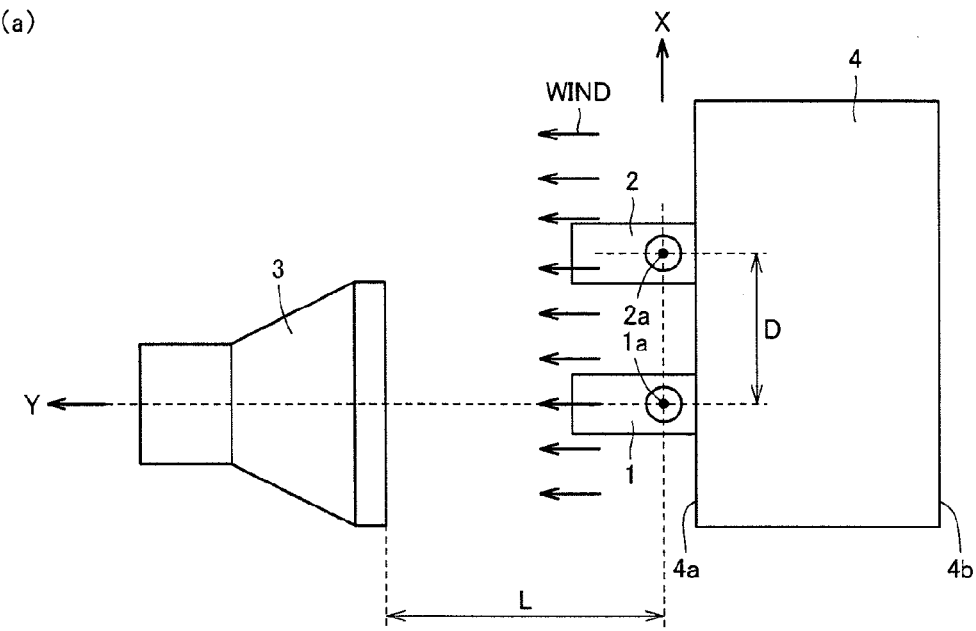
(b)
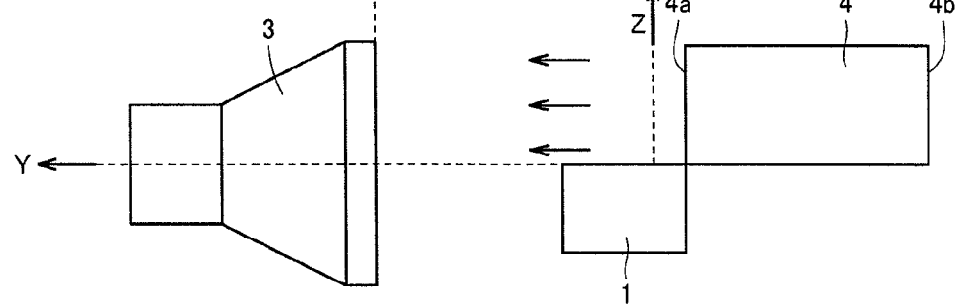

FIG.2
(a) WIND VELOCITY 8 m/s
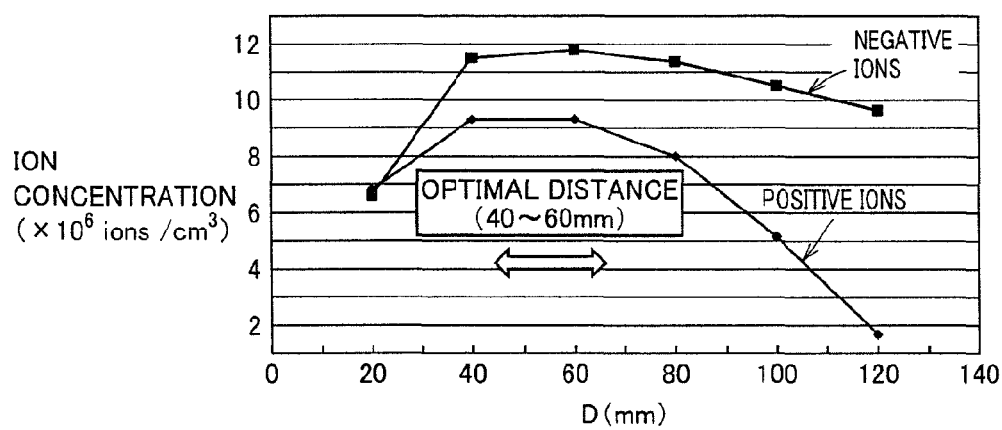
(b) WIND VELOCITY 5 m/s
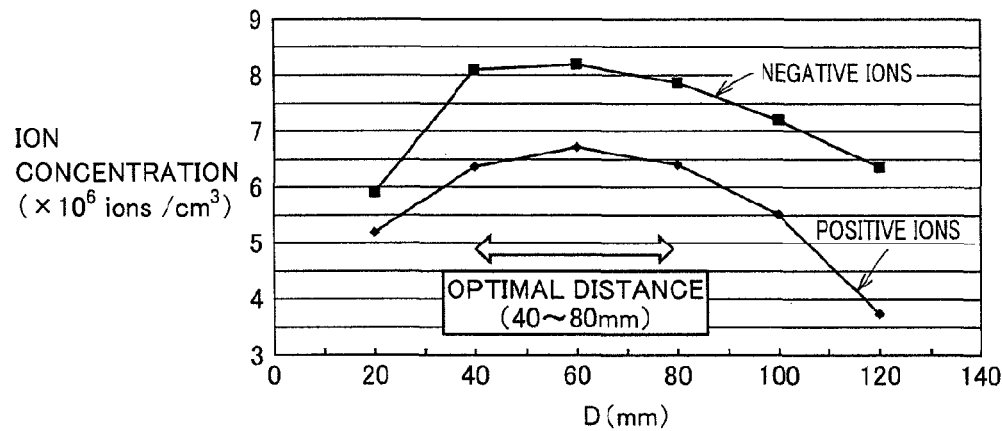

FIG.3
(a) AT HIGH WIND VELOCITY
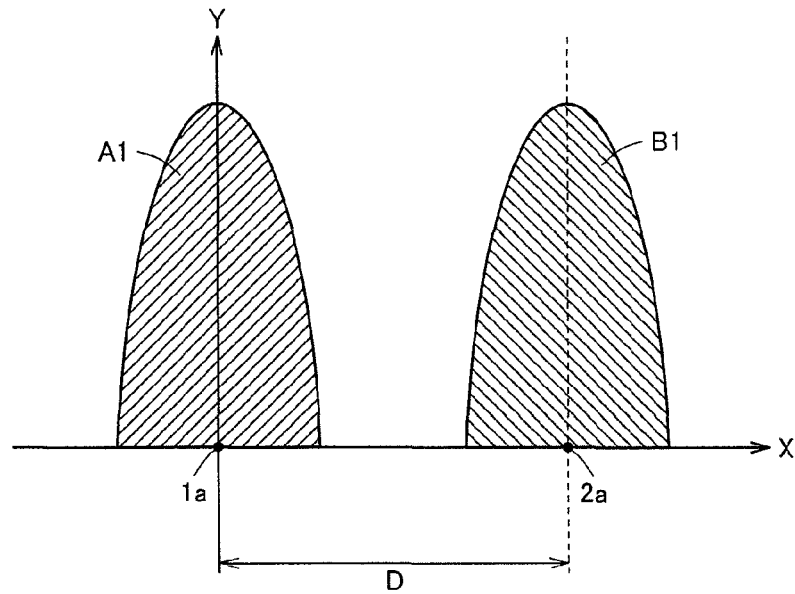
(b) AT LOW WIND VELOCITY
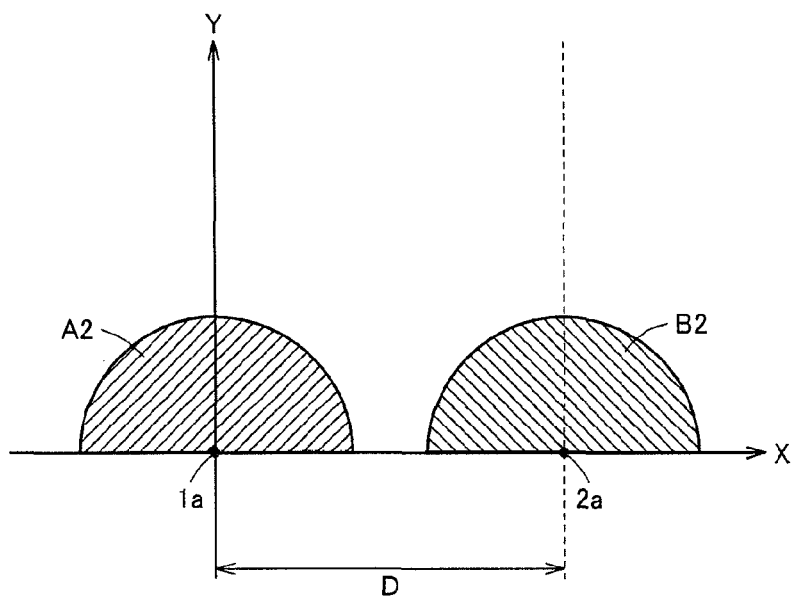

ION GENERATION METHOD, ION GENERATION APPARATUS, AND ELECTRIC EQUIPMENT USING THE SAME

CROSS-REFERENCE TO RELATED APPLICATIONS

This application is a National Stage Application of PCT/JP2010/058616 filed on May 21, 2010, the entire disclosure being incorporated herein by reference.

TECHNICAL FIELD

The present invention relates to an ion generation method generating positive ions and negative ions, an ion generation apparatus, and electric equipment using the same.

BACKGROUND ART

Recently, ion generation apparatuses generating both positive ions and negative ions have been put to practical use. FIG. 19 is a perspective view showing a main portion of a conventional ion generation apparatus. In FIG. 19, the ion generation apparatus includes a substrate 91, an induction electrode 92 mounted on a surface of substrate 91, and two needle electrodes 98 and 99.

Induction electrode 92 is formed of one metal plate. Two through holes 94 and 95 are formed in a flat plate portion 93 of induction electrode 92, and a plurality of support portions 96 are formed at a circumferential portion of flat plate portion 93. A substrate insertion portion 97 having a width smaller than that of support portion 96 is formed at a lower end of each of support portions 96 at both ends of flat plate portion 93, and each substrate insertion portion 97 is inserted into a through hole in substrate 91 and soldered. Each of two needle electrodes 98 and 99 is inserted into a through hole in substrate 91 and soldered. Tip ends of needle electrodes 98 and 99 protrude from the surface of substrate 91, and are placed at the centers of through holes 94 and 95, respectively.

When positive high-voltage pulses and negative high-voltage pulses are applied between needle electrodes 98, 99 and induction electrode 92, respectively, corona discharge occurs at tip end portions of needle electrodes 98 and 99, and positive ions and negative ions are generated at the tip end portions of needle electrodes 98 and 99, respectively. The generated positive ions and negative ions are delivered into a room by an air blower, and surround and decompose molds or viruses floating in the air (see for example Patent Literature 1 (Japanese Patent Laying-Open No. 2007-305321).

Citation List
Patent Literature
  PTL 1: Japanese Patent Laying-Open No. 2007-305321

SUMMARY OF INVENTION

Technical Problem

However, the conventional ion generation apparatus has a problem that the amount of ion generation is small.

Therefore, a main object of the present invention is to provide an ion generation method generating a large amount of ions, an ion generation apparatus, and electric equipment using the same.

Solution to Problem

An ion generation method in accordance with the present invention is an ion generation method generating positive ions and negative ions, including providing a first ion generation portion generating positive ions and a second ion generation portion generating negative ions, and adjusting a distance between the first and second ion generation portions to adjust an amount of ion generation.

Preferably, the distance between the first and second ion generation portions is adjusted in accordance with wind velocity at positions where the first and second ion generation portions are installed.

Further, an ion generation apparatus in accordance with the present invention is an ion generation apparatus generating positive ions and negative ions, including a first ion generation portion generating positive ions, a second ion generation portion generating negative ions, and a first adjustment portion adjusting a distance between the first and second ion generation portions to adjust an amount of ion generation.

Preferably, the first adjustment portion adjusts the distance between the first and second ion generation portions in accordance with wind velocity at positions where the first and second ion generation portions are installed.

Preferably, the ion generation apparatus further includes a detection portion detecting the wind velocity at the positions where the first and second ion generation portions are installed, and the first adjustment portion adjusts the distance between the first and second ion generation portions based on a detection result of the detection portion.

Preferably, the ion generation apparatus further includes a second adjustment portion adjusting the wind velocity at the positions where the first and second ion generation portions are installed, and the first adjustment portion adjusts the distance between the first and second ion generation portions in response to a signal indicating the wind velocity output from the second adjustment portion.

Further, another ion generation apparatus in accordance with the present invention is an ion generation apparatus generating positive ions and negative ions, including a first ion generation portion generating positive ions, and a second ion generation portion generating negative ions. A distance between the first and second ion generation portions is adjustable.

Preferably, the distance between the first and second ion generation portions is set to a prescribed value in accordance with wind velocity at positions where the first and second ion generation portions are installed.

Further, still another ion generation apparatus in accordance with the present invention is an ion generation apparatus generating positive ions and negative ions, including plural sets each including a first ion generation portion generating positive ions and a second ion generation portion generating negative ions. A distance between the first and second ion generation portions in each set is different from a distance between the first and second ion generation portions in another set. The ion generation apparatus further includes a control portion selecting one, two, or more sets of the plural sets of the first and second ion generation portions based on wind velocity at positions where the first and second ion generation portions are installed, and activating the selected set(s) of the first and second ion generation portions.

Preferably, the ion generation apparatus further includes a detection portion detecting the wind velocity at the positions where the first and second ion generation portions are installed, and the control portion selects one, two, or more sets of the plural sets of the first and second ion generation portions based on a detection result of the detection portion.

Preferably, the ion generation apparatus further includes a switching portion switching the wind velocity at the positions where the first and second ion generation portions are installed, in plural stages, and the control portion selects one, two, or more sets of the plural sets of the first and second ion generation portions in response to a signal indicating a stage of the wind velocity output from the switching portion.

Preferably, the plural sets of the first and second ion generation portions are placed along one straight line. Each set of the first and second ion generation portions is placed between a set of the first and second ion generation portions having a distance therebetween larger than that of the each set.

Preferably, the first and second ion generation portions are alternately placed, and the second ion generation portion is placed adjacent to each first ion generation portion. A distance between the adjacent first and second ion generation portions is substantially identical to a distance between the adjacent other first and second ion generation portions.

Preferably, the first ion generation portion includes a first induction electrode having a first hole, a first needle electrode having a tip end placed at a central portion of the first hole, and a first power supply circuit applying a positive voltage between the first needle electrode and the first induction electrode. The second ion generation portion includes a second induction electrode having a second hole, a second needle electrode having a tip end placed at a central portion of the second hole, and a second power supply circuit applying a negative voltage between the second needle electrode and the second induction electrode. The distance between the first and second ion generation portions is a distance between the first and second needle electrodes.

Further, electric equipment in accordance with the present invention includes the ion generation apparatus described above, and an air blowing portion for delivering positive ions and negative ions generated at the ion generation apparatus.

ADVANTAGEOUS EFFECTS OF INVENTION

In the ion generation method and the ion generation apparatus in accordance with the present invention, a first ion generation portion generating positive ions and a second ion generation portion generating negative ions are provided, and a distance between the first and second ion generation portions is adjusted to adjust an amount of ion generation. Therefore, the distance between the first and second ion generation portions can be set to an optimal value, and a large amount of ion generation can be obtained.

Further, in another ion generation apparatus in accordance with the present invention, a first ion generation portion generating positive ions and a second ion generation portion generating negative ions are provided, and a distance between the first and second ion generation portions is adjustable. Therefore, the distance between the first and second ion generation portions can be set to an optimal value, and a large amount of ion generation can be obtained.

Furthermore, in still another ion generation apparatus in accordance with the present invention, plural sets each including a first ion generation portion generating positive ions and a second ion generation portion generating negative ions are provided. A distance between the first and second ion generation portions in one set is different from a distance between the first and second ion generation portions in another set. One, two, or more sets of the plural sets of the first and second ion generation portions is/are selected based on wind velocity at positions where the first and second ion generation portions are installed, and the selected set(s) of the first and second ion generation portions is/are activated. Therefore, the first and second ion generation portions having an optimal distance therebetween can be selected in accordance with the wind velocity, and a large amount of ion generation can be obtained.

BRIEF DESCRIPTION OF DRAWINGS

FIG. 1 is a view showing an experimental apparatus for describing the principle of the invention of the present application.

FIG. 2 is a view showing experimental results obtained using the experimental apparatus shown in FIG. 1.

FIG. 3 is a view for describing the reason why the experimental results shown in FIG. 2 were obtained.

DESCRIPTION OF EMBODIMENTS

Figure 4:
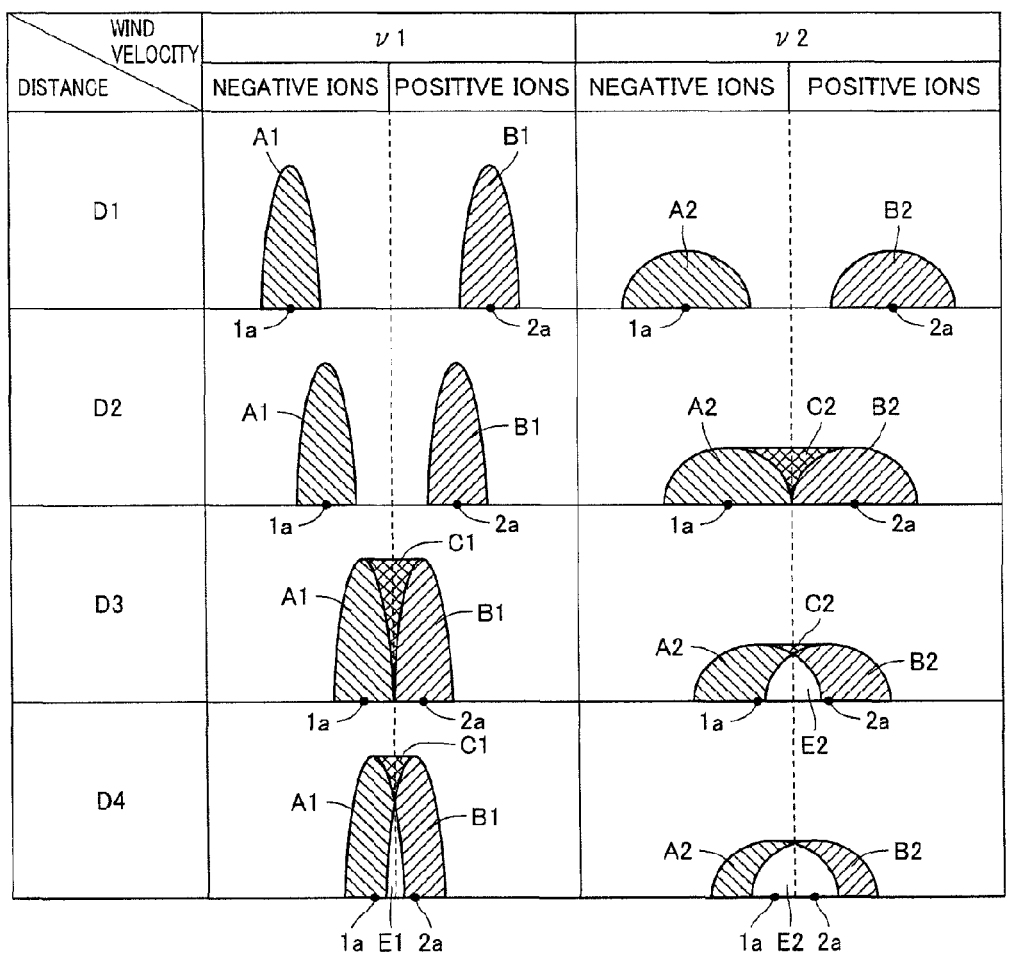
FIG. 4 is another view for describing the reason why the experimental results shown in FIG. 2 were obtained.

Before stating the description of embodiments, the principle of the invention of the present application will be firstly described. It has been found that, generally in an ion generation apparatus, if the distance between a positive ion generation portion and a negative ion generation portion is too small, positive ions recombine with negative ions, causing a reduction in the amount of ion generation. Thus, the distance between the positive ion generation portion and the negative ion generation portion should be larger than a certain value.

The inventor of the present application has further found that, if the distance between the positive ion generation portion and the negative ion generation portion is too large, the amount of ion generation is reduced on the contrary, namely, that the distance between the positive ion generation portion and the negative ion generation portion has an optimal range in which the amount of ion generation becomes maximum. The inventor of the present application has also found that the optimal range of the distance between the positive ion generation portion and the negative ion generation portion varies depending on wind velocity at positions where the ion generation portions are placed.

FIG. 1(a) is a plan view showing a configuration of an experimental apparatus used to investigate the relationship among a distance D between a positive ion generation apparatus 2 and a negative ion generation apparatus 1, wind velocity at positions where ion generation apparatuses 1, 2 are placed, and the amount of ion generation, and FIG. 1(b) is a front view thereof.

In FIGS. 1(a) and 1(b), in the experimental apparatus, a needle electrode 1a of negative ion generation apparatus 1 was placed at the origin of an XY plane, and a needle electrode 2a of positive ion generation apparatus 2 was placed on an X axis. Tip ends of needle electrodes 1a, 2a were directed in a Z axis direction. Negative ion generation apparatus 1 was fixed, and positive ion generation apparatus 2 was moved in an X axis direction, to change distance D between the tip end of needle electrode 2a of positive ion generation apparatus 2 and the tip end of needle electrode 1a of negative ion generation apparatus 1, in six stages between 20 mm and 120 mm.

The center line of an ion counter 3 was aligned with a Y axis, and ion counter 3 was placed to be directed to the origin. A length L from the origin to ion counter 3 was fixed to 250 mm. An ion inlet of ion counter 3 had a diameter of 100 mm. A duct 4 for blowing air was placed on the XY plane, on a side opposite to ion counter 3, with ion generation apparatuses 1, 2 interposed therebetween. The lower edge of a rectangular exit 4a of duct 4 was placed along upper ends of ion generation apparatuses 1, 2 to be parallel to the X axis. An air blower (not shown) was coupled to an entrance 4b of duct 4, and set such that wind at a constant velocity would blow out uniformly from exit 4a of duct 4. The wind velocity was changed in two stages, that is, 5 m/s and 8 m/s.

FIGS. 2(a) and 2(b) are views showing experimental results, and showing the relationship between ion concentration and distance D between ion generation apparatuses 1 and 2. In FIGS. 2(a) and 2(b), wind velocity was set to 8 m/s and 5 m/s, respectively. As can be seen from FIGS. 2(a) and 2(b), higher ion concentration is obtained at a higher wind velocity.

In addition, at the wind velocity of 8 m/s, the ion concentration becomes highest when distance D is in a range of 40 to 60 mm. If distance D is 20 mm or smaller, the ion concentration becomes about half a peak value or lower, and if distance D is 100 mm or larger, positive ion concentration is drastically reduced and negative ion concentration is also reduced. Further, at the wind velocity of 5 m/s, the ion concentration becomes highest when distance D is in a range of 40 to 80 mm. If distance D is 20 mm or smaller, the ion concentration becomes about 70% of a peak value or lower, and if distance D is 100 mm or larger, positive ion concentration is drastically reduced and negative ion concentration is also reduced, Therefore, when the wind velocity at the positions where ion generation apparatuses 1, 2 are installed is 8 m/s, the ion concentration becomes maximum if distance D between ion generation apparatuses 1 and 2 is set in the range of 40 to 60 mm, for example, to 50 mm. Further, when the wind velocity at the positions where ion generation apparatuses 1, 2 are installed is 5 m/s, the ion concentration becomes maximum if distance D between ion generation apparatuses 1 and 2 is set in the range of 40 to 80 mm, for example, to 60 mm.

Next, the reason why such experimental results were obtained will be described. When wind is supplied through duct 4 and ion generation apparatuses 1, 2 are caused to discharge, a negative ion flow and a positive ion flow are generated downstream of needle electrodes 1a and 2a of ion generation apparatuses 1 and 2, respectively. At a high wind velocity, as shown in FIG. 3(a), a mountain-shaped negative ion region A1 having a negative ion concentration higher than a prescribed value is generated downstream of needle electrode 1a, and a mountain-shaped positive ion region B1 having a positive ion concentration higher than a prescribed value is generated downstream of needle electrode 2a. At a low wind velocity, as shown in FIG. 3(b), a mountain-shaped negative ion region A2 having a negative ion concentration higher than a prescribed value is generated downstream of needle electrode 1a, and a mountain-shaped positive ion region B2 having a positive ion concentration higher than a prescribed value is generated downstream of needle electrode 2a.

Since ions generated at needle electrodes 1a, 2a are carried downstream by the wind, the length of negative ion region A1 in a Y axis direction (i.e., direction of the wind) is larger than the length of negative ion region A2 in the Y axis direction, and the length of negative ion region A1 in the X axis direction is smaller than the length of negative ion region A2 in the X axis direction.

Further, at a high wind velocity, ions generated at needle electrodes 1a, 2a are quickly removed from needle electrodes 1a, 2a, and ion generation is promoted. In contrast, at a low wind velocity, ions generated at needle electrodes 1a, 2a remain around needle electrodes 1a, 2a, and ion generation is suppressed. Therefore, when the wind velocity is high, the amount of ion generation is greater than that when the wind velocity is low, and areas of ion regions A1 and B1 are greater than areas of ion regions A2 and B2, respectively. Thus, in FIGS. 2(a) and 2(b), the ion concentration when the wind velocity is 8 m/s is higher than the ion concentration when the wind velocity is 5 m/s.

FIG. 4 is a view showing the relationship among the ion regions, a wind velocity v, and distance D between needle electrodes 1a and 2a. As shown in the uppermost column in FIG. 4, in the case where distance D is sufficiently large (D=D1), ion regions A1 and B1 generated when wind velocity v is high (v=v1) and ion regions A2 and B2 generated when wind velocity v is low (v=v2) are as illustrated in FIGS. 3(a) and 3(b).

Next, as shown in the second column in FIG. 4, if distance D is reduced (D=D2<D1) to the extent that feet of negative ion region A2 and positive ion region B2 are brought into contact with each other, negative ions in negative ion region A2 are attracted to positive ion region B2 by the Coulomb force, and positive ions in positive ion region B2 are attracted to negative ion region A2 by the Coulomb force, generating a mixed region C2 between negative ion region A2 and positive ion region B2. As with the wind, mixed region C2 removes ions from needle electrodes 1a and 2a and promotes ion generation. Thus, in FIGS. 2(a) and 2(b), at the wind velocity of 5 m/s, the ion concentration becomes maximum when distance D between ion generation apparatuses 1 and 2 is in the optimal range (40 to 80 mm).

Subsequently, as shown in the third column in FIG. 4, if distance D is reduced (D=D3<D2) to the extent that feet of negative ion region A1 and positive ion region B1 are brought into contact with each other, negative ions in negative ion region A1 are attracted to positive ion region B1 by the Coulomb force, and positive ions in positive ion region B1 are attracted to negative ion region A1 by the Coulomb force, generating a mixed region C1 between negative ion region A1 and positive ion region B1. As with the wind, mixed region C1 removes ions from needle electrodes 1a and 2a and promotes ion generation. Thus, in FIGS. 2(a) and 2(b), at the wind velocity of 8 m/s, the ion concentration becomes maximum when distance D between ion generation apparatuses 1 and 2 is in the optimal range (40 to 60 mm).

In contrast, in the case of D=D3 and v=v2, negative ion region A2 overlaps with positive ion region B2, generating a recombination region E2. In recombination region E2, negative ions recombine with positive ions and they disappear. Thus, in FIGS. 2(*a*) and 2(*b*), at the wind velocity of 5 m/s, if distance D between ion generation apparatuses 1 and 2 is 20 mm or smaller, the ion concentration is reduced to about 70% of the peak value or lower.

Next, as shown in the fourth column in FIG. 4, if distance D is further reduced (D=D4<D3), negative ion region A1 overlaps with positive ion region B1, generating a recombination region E1. In recombination region E1, negative ions recombine with positive ions and they disappear. Thus, in FIGS. 2(*a*) and 2(*b*), also at the wind velocity of 8 m/s, if distance D between ion generation apparatuses 1 and 2 is 20 mm or smaller, the ion concentration is reduced to about 70% of the peak value or lower. Namely, it can be said that the amount of ion generation is proportional to the total area of regions A1, B1, and C1 (or regions A2, B2, and C2).

The experimental results described above have indicated that distance D between needle electrodes 1*a* and 2*a* has a range which is optimal for maximizing the amount of ion generation, and that the optimal range varies depending on wind velocity v at positions where needle electrodes 1*a*, 2*a* are placed.

Consequently, in the invention of the present application, the amount of ion generation is adjusted by adjusting distance D between needle electrodes 1*a* and 2*a* of the ion generation apparatuses. Further, in the invention of the present application, the amount of ion generation is adjusted by adjusting distance D between needle electrodes 1*a* and 2*a* of the ion generation apparatuses in accordance with wind velocity v at the positions where needle electrodes 1*a*, 2*a* are placed. Thereby, distance D between needle electrodes 1*a* and 2*a* can be set to an optimal value, and the amount of ion generation can be maximized.

[Embodiment 1]

Figure 5:
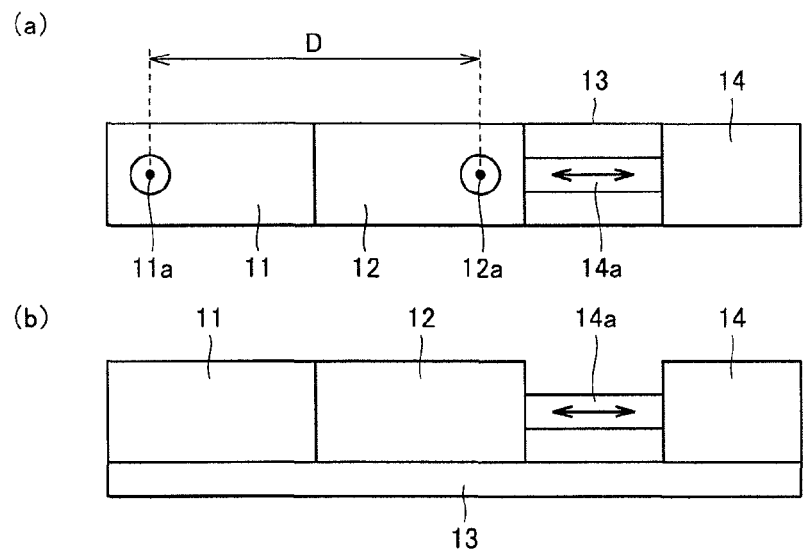
FIG. 5 is a view showing a configuration of an ion generation apparatus for an air cleaner in accordance with Embodiment 1 of the present invention.

FIG. 5(*a*) is a plan view showing an ion generation apparatus for an air cleaner in accordance with Embodiment 1 of the present invention, and FIG. 5(*b*) is a front view thereof. In FIGS. 5(*a*) and 5(*b*), the ion generation apparatus includes a negative ion generation portion 11, a positive ion generation portion 12, a rail 13, and a drive portion 14. Negative ion generation portion 11 is fixed to one end portion of rail 13, and drive portion 14 is fixed to the other end portion of rail 13. Positive ion generation portion 12 is supported by rail 13 to be movable in a length direction of rail 13. Further, positive ion generation portion 12 is coupled to a tip end of a drive shaft 14*a* of drive portion 14.

Drive portion 14 includes, for example, a stepping motor. Drive portion 14 moves positive ion generation portion 12 by extending and contracting drive shaft 14*a* in the length direction of rail 13 to adjust distance D between a needle electrode 11*a* of negative ion generation portion 11 and a needle electrode 12*a* of positive ion generation portion 12.

Although ion generation portions 11 and 12 are placed in FIG. 5(*a*) such that needle electrodes 11*a* and 12*a* are provided on one end side and the other end side of rail 13, respectively, ion generation portions 11 and 12 may be placed such that needle electrodes 11*a* and 12*a* are provided on the other end side and one end side of rail 13, respectively. Further, ion generation portions 11 and 12 may be placed such that both needle electrodes 11*a* and 12*a* are provided on one end side of rail 13, and may be placed such that both needle electrodes 11*a* and 12*a* are provided on the other end side of rail 13.

Figure 6:
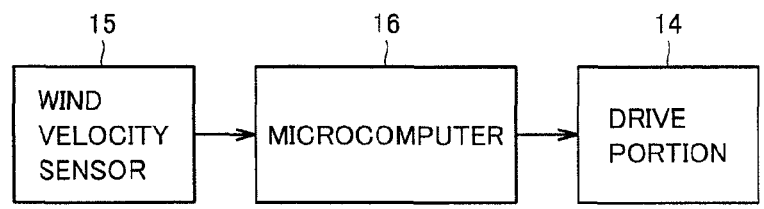
FIG. 6 is a block diagram showing a portion related to control of a drive portion shown in FIG. 5.

As shown in FIG. 6, the air cleaner further includes a wind velocity sensor 15 and a microcomputer 16. Wind velocity sensor 15 detects wind velocity v at a position where the ion generation apparatus is placed, and outputs a signal indicating a detected value. Microcomputer 16 controls drive portion 14 in response to the output signal of wind velocity sensor 15, and sets distance D between needle electrodes 11*a* and 12*a* to an optimal value in accordance with wind velocity v. Microcomputer 16 stores an equation or a table representing the relationship between wind velocity v and the optical value for distance D between needle electrodes 11*a* and 12*a*, and sets distance D to the optimal value in accordance with the detected value of wind velocity v. For example, as shown in FIG. 4, if v=v1, microcomputer 16 sets distance D to D3, and if v=v2, microcomputer 16 sets distance D to D2.

Figure 7:
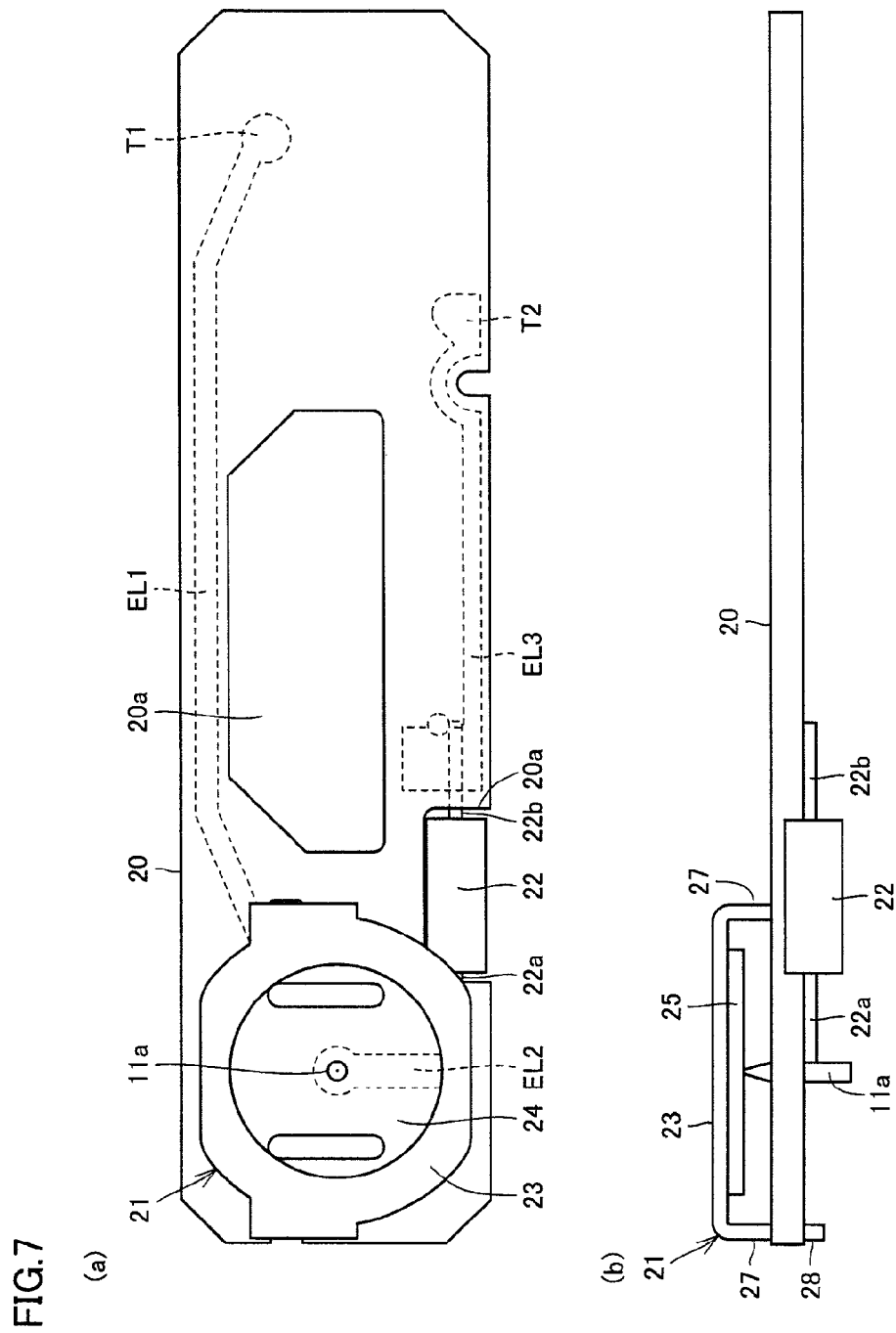
FIG. 7 is a view showing a main portion of a negative ion generation portion shown in FIG. 5.

FIG. 7(*a*) is a plan view showing a main portion of negative ion generation portion 11, and FIG. 7(*b*) is a front view thereof. In FIGS. 7(*a*) and 7(*b*), negative ion generation portion 11 includes a substrate 20, an induction electrode 21, needle electrode 11*a*, and a diode 22. Substrate 17 is a rectangular printed substrate. Induction electrode 21 is mounted at one end portion (i.e., the left end portion in the drawing) on a front surface of substrate 20.

Figure 8:
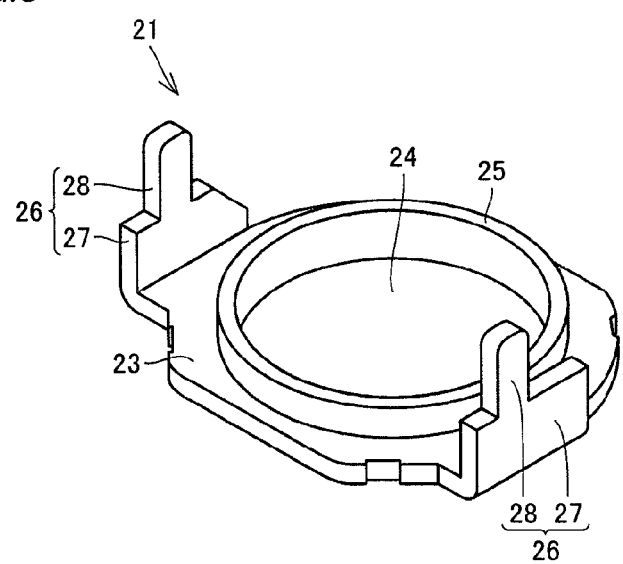
FIG. 8 is a perspective view showing an induction electrode shown in FIG. 7.

FIG. 8 is a perspective view of induction electrode 21 seen from below. In FIG. 8, induction electrode 21 is formed of one metal plate. A circular through hole 24 is formed at the center of a flat plate portion 23 of induction electrode 21. Through hole 24 has a diameter of, for example, 9 mm. Through hole 24 serves as an opening for emitting ions generated by corona discharge to the outside. A circumferential portion of through hole 24 is formed as a bent portion 25 that is formed by bending the metal plate from flat plate portion 23 using a method such as drawing. By the presence of bent portion 25, the circumferential portion of through hole 24 has a thickness (for example, 1.6 mm) greater than a thickness of flat plate portion 23 (for example, 0.6 mm).

In addition, a leg portion 26 formed by bending a portion of the metal plate from flat plate portion 23 is provided at each of both end portions of flat plate portion 23. Each leg portion 26 includes a support portion 27 on a base end side and a substrate insertion portion 28 on a tip end side. When seen from a front surface of flat plate portion 23, support portion 27 has a height (for example, 2.6 mm) greater than the thickness of the circumferential portion of through hole 24 (for example, 1.6 mm).

Substrate insertion portion 28 has a width (for example, 1.2 mm) smaller than a width of support portion 27 (for example, 4.5 mm).

Turning back to FIGS. 7(*a*) and 7(*b*), two substrate insertion portions 28 of induction electrode 21 are inserted into two through holes (not shown) formed in one end portion of substrate 20. The two through holes are arranged in a length direction of substrate 20. A tip end portion of each substrate insertion portion 28 is soldered to an electrode on a back surface of substrate 20. A lower end surface of support portion 27 abuts on the front surface of substrate 20. Therefore, flat plate portion 23 is placed parallel to the front surface of substrate 20 with a prescribed gap left therebetween. Substrate insertion portions 28 of induction electrode 21 are soldered to one end portion of an electrode EL1 on the back surface of substrate 1. The other end portion of electrode EL1 is connected to a terminal T1.

Further, a through hole (not shown) through which the center line of through hole 24 in induction electrode 21 passes is formed in substrate 20, and needle electrode 11a is inserted into the through hole. Needle electrode 11a is provided to generate negative ions. A tip end of needle electrode 11a protrudes from the front surface of substrate 20, a base end thereof protrudes from the back surface of substrate 20, and a central portion thereof is soldered to an electrode EL2 formed on the back surface of substrate 20. When seen from the front surface of substrate 20, the tip end of needle electrode 11a has a height that is set within a range between the height of a lower end and the height of an upper end of bent portion 25 of induction electrode 21.

An anode terminal wire 22a of diode 22 is soldered to electrode EL2, and electrically connected to needle electrode 11a. A cathode terminal wire 22b of diode 22 is soldered to one end portion of an electrode EL3 on the back surface of substrate 20. The other end portion of electrode EL3 is connected to a terminal T2.

At a plurality of locations in substrate 20, cutout portions 20a are formed for receiving a main body portion of diode 22 or separating electrodes EL2 and EL3 applied with a high voltage from electrode EL1. applied with a reference voltage. Cutout portion 20a is filled with mold resin.

Figure 9:
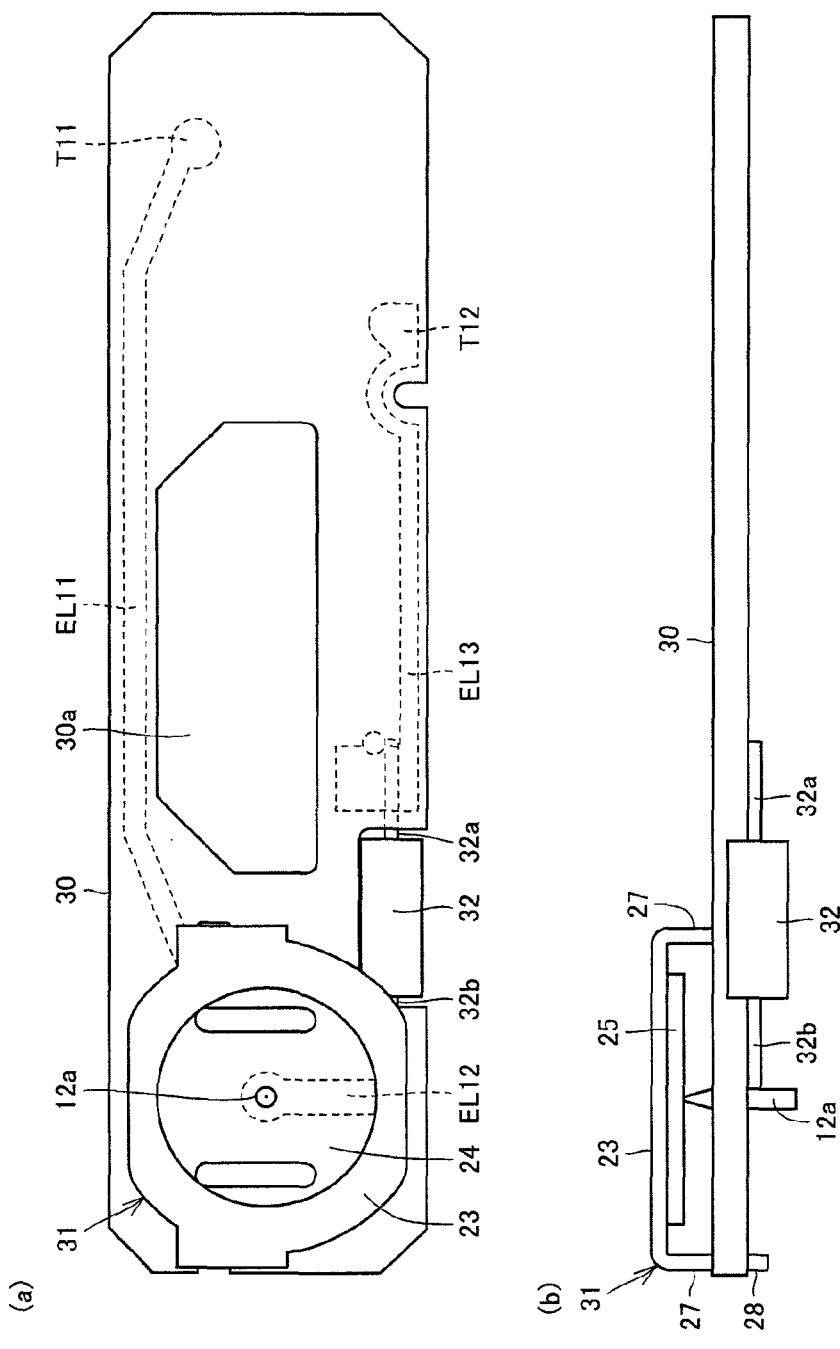
FIG. 9 is a view showing a main portion of a positive ion generation portion shown in FIG. 5.

FIG. 9(a) is a plan view showing a main portion of positive ion generation portion 12, and FIG. 9(b) is a front view thereof. In FIGS. 9(a) and 9(b), positive ion generation portion 12 includes a substrate 30, an induction electrode 31, needle electrode 12a, and a diode 32. Substrate 30 is a rectangular printed substrate. Induction electrode 31 is mounted at one end portion (i.e., the left end portion in the drawing) on a front surface of substrate 30. Induction electrode 31 has the same configuration as induction electrode 21 shown in FIG. 8.

Two substrate insertion portions 28 of induction electrode 31 are inserted into two through holes (not shown) formed in one end portion of substrate 30. The two through holes are arranged in a length direction of substrate 30. A tip end portion of each substrate insertion portion 28 is soldered to an electrode on a back surface of substrate 30. A lower end surface of support portion 27 abuts on the front surface of substrate 30. Therefore, flat plate portion 23 is placed parallel to the front surface of substrate 30 with a prescribed gap left therebetween. Substrate insertion portions 28 of induction electrode 31 are soldered to one end portion of an electrode EL11 on the back surface of substrate 30. The other end portion of electrode EL11 is connected to a terminal T11.

Further, a through hole (not shown) through which the center line of through hole 24 in induction electrode 31 passes is formed in substrate 30, and needle electrode 12a is inserted into the through hole. Needle electrode 12a is provided to generate positive ions. A tip end of needle electrode 12a protrudes from the front surface of substrate 30, a base end thereof protrudes from the back surface of substrate 30, and a central portion thereof is soldered to an electrode EL12 formed on the back surface of substrate 30. When seen from the front surface of substrate 30, the tip end of needle electrode 12a has a height that is set within a range between the height of a lower end and the height of an upper end of bent portion 25 of induction electrode 31.

A cathode terminal wire 32b of diode 32 is soldered to electrode EL12, and electrically connected to needle electrode 12a. An anode terminal wire 32a of diode 32 is soldered to one end portion of an electrode EL13 on the back surface of substrate 30. The other end portion of electrode EL13 is connected to a terminal T12.

At a plurality of locations in substrate 30, cutout portions 30a are formed for receiving a main body portion of diode 32 or separating electrodes EL12 and EL13 applied with a high voltage from electrode EL11 applied with a reference voltage. Cutout portion 30a is filled with mold resin.

Figure 10:
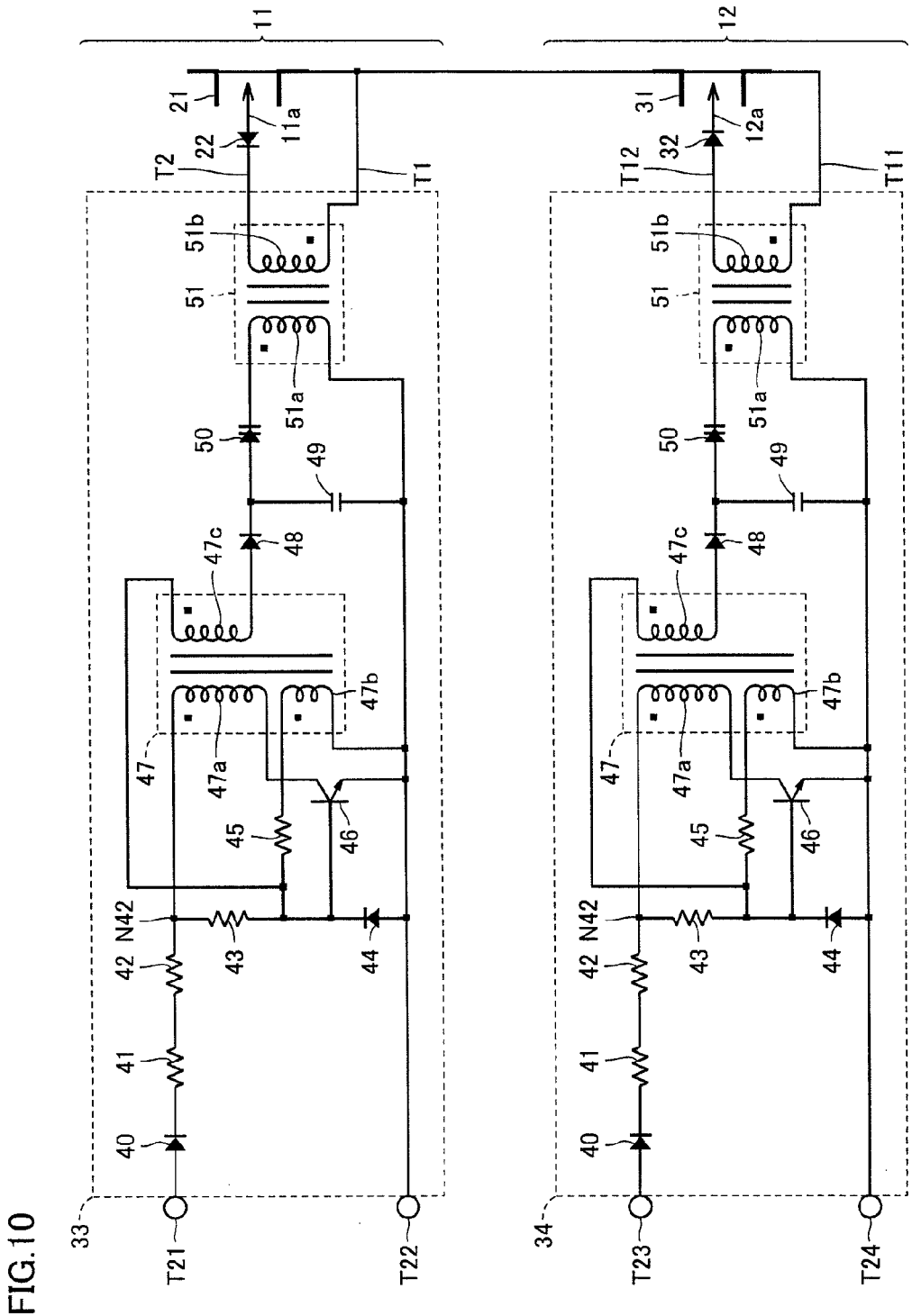
FIG. 10 is a circuit diagram showing a configuration of the ion generation apparatus shown in FIG. 5.

FIG. 10 is an electrical circuit diagram showing configurations of ion generation portions 11, 12. In FIG. 10, in addition to substrate 20 shown in FIGS. 7(a) and 7(b), negative ion generation portion 11 includes a power supply terminal T21, a ground terminal 122, and a power supply circuit 33. Power supply circuit 33 includes diodes 40, 44, and 48, resistance elements 41 to 43 and 45, an NPN bipolar transistor 46, pulse transformers 47 and 51, a capacitor 49, and a diode thyristor 50.

A positive terminal and a negative terminal of a direct current (DC) power supply are connected to power supply terminal T21 and ground terminal T22, respectively. A DC power supply voltage (for example, +12V or +15V) is applied to power supply terminal T21, and ground terminal T22 is grounded. Diode 40 and resistance elements 41 to 43 are connected in series between power supply terminal T21 and a base of transistor 46. An emitter of transistor 46 is connected to ground terminal T22. Diode 44 is connected between ground terminal T22 and the base of transistor 46.

Diode 40 serves as an element for protecting the DC power supply by blocking a current when the positive terminal and the negative terminal of the DC power supply are reversely connected to terminals T21 and T22. Resistance elements 41 and 42 serve as elements for limiting a boost operation. Resistance element 43 is a starting resistance element. Diode 44 operates as a reverse voltage protection element for transistor 46.

Pulse transformer 47 includes a primary winding 47a, a base winding 47b, and a secondary winding 47c. Primary winding 47a has one terminal connected to a node N42 between resistance elements 42 and 43, and the other terminal connected to a collector of transistor 46. Base winding 47b has one terminal connected to the base of transistor 46 via resistance element 45. Secondary winding 47c has one terminal connected to the base of transistor 46, and the other terminal connected to ground terminal T22 via diode 48 and capacitor 49.

Pulse transformer 51 includes a primary winding 51a and a secondary winding 51b. Diode thyristor 50 is connected between a cathode of diode 48 and one terminal of primary winding 51a. The other terminal of primary winding 51a is connected to ground terminal T22. Secondary winding 51b has one terminal connected to induction electrode 21, and the other terminal connected to a cathode of diode 22. An anode of diode 22 is connected to needle electrode 11a.

Resistance element 45 serves as an element for limiting a base current. Diode thyristor 50 is an element that becomes conductive when a voltage across terminals reaches a breakover voltage, and becomes nonconductive when a current is reduced to a minimum holding current or less.

Next, an operation of negative ion generation portion 11 will be described. Capacitor 49 is charged by an operation of an RCC-type switching power supply.

Specifically, when the DC power supply voltage is applied across power supply terminal T21 and ground terminal T22, a current flows from power supply terminal T21 to the base of transistor 46 via diode 40 and resistance elements 41 to 43, and transistor 46 becomes conductive. Thereby, a current flows to primary winding 47a of pulse transformer 47, and a voltage is generated across the terminals of base winding 47b.

The winding direction of base winding 47b is set to further increase a base voltage of transistor 46 when transistor 46 becomes conductive. Therefore, the voltage generated across the terminals of base winding 47b reduces a conductive resistance value of transistor 46 in a positive feedback state. The winding direction of secondary winding 47c is set such that diode 48 blocks energization on this occasion, and no current flows to secondary winding 47c.

As the current flowing to primary winding 47a and transistor 46 continues to increase in this manner, a collector voltage of transistor 46 is increased beyond a saturation region. Thereby, a voltage across the terminals of primary winding 47a is reduced, the voltage across the terminals of base winding 47b is also reduced, and thus the collector voltage of transistor 46 is further increased. Accordingly, transistor 46 operates in the positive feedback state, and transistor 46 immediately becomes nonconductive. On this occasion, secondary winding 47c generates a voltage in a conducting direction of diode 48. Thereby, capacitor 49 is charged. When a voltage across terminals of capacitor 49 is increased to reach the breakover voltage of diode thyristor 50, diode thyristor 50 operates like a Zener diode and further passes a current. When the current flowing to diode thyristor 50 reaches a breakover current, diode thyristor 50 is substantially short-circuited, and an electric charge charged in capacitor 49 is discharged via diode thyristor 50 and primary winding 51a of pulse transformer 51, generating an impulse voltage in primary winding 51a.

When the impulse voltage is generated in primary winding 51a, positive and negative high-voltage pulses are alternately generated in an attenuating manner in secondary winding 51b. The negative high-voltage pulses are applied to needle electrode 11a via diode 22. Thereby, corona discharge occurs at the tip end of needle electrode 11a, and negative ions are generated.

On the other hand, when a current flows to secondary winding 47c of pulse transformer 47, the voltage across the terminals of primary winding 47a is increased and transistor 46 becomes conductive again, and the operation described above is repeated. The speed of repeating the operation is increased with an increase in the current flowing to the base of transistor 46. Therefore, by adjusting a resistance value of resistance element 41, the current flowing to the base of transistor 46 can be adjusted, and thus the number of discharges by needle electrode 11a can be adjusted. Further, in addition to substrate 30 shown in FIGS. 9(a) and 9(b), positive ion generation portion 12 includes a power supply terminal T23, a ground terminal T24, and a power supply circuit 34. Power supply circuit 34 has the same configuration as power supply circuit 33. A positive terminal and a negative terminal of a DC power supply are connected to power supply terminal T23 and ground terminal T24, respectively. A DC power supply voltage (for example, +12V or +15V) is applied to power supply terminal T23, and ground terminal T24 is grounded.

Secondary winding 51b of pulse transformer 51 has one terminal connected to induction electrode 31, and the other terminal connected to an anode of diode 32. A cathode of diode 32 is connected to needle electrode 12a. Induction electrode 31 is connected to induction electrode 21.

When the DC power supply voltage is applied across power supply terminal T21 and ground terminal T22, an impulse voltage is generated in primary winding 51a of pulse transformer 51. When the impulse voltage is generated in primary winding 51a, positive and negative high-voltage pulses are alternately generated in an attenuating manner in secondary winding 51b. The positive high-voltage pulses are applied to needle electrode 12a via diode 32. Thereby, corona discharge occurs at the tip end of needle electrode 12a, and positive ions are generated.

Here, positive ions are cluster ions formed in such a manner that a plurality of water molecules surround a hydrogen ion ($H^+$), and expressed as $H^+(H_2O)_m$ (m is any natural number). In addition, negative ions are cluster ions formed in such a manner that a plurality of water molecules surround an oxygen ion ($O_2^-$), and expressed as $O_2^-(H_2O)_n$ (n is any natural number). When positive ions and negative ions are emitted into a room, both ions surround molds or viruses floating in the air, and cause a chemical reaction with each other on the surfaces thereof. As a result of action of hydroxyl radicals (.OH) representing active species produced at that time, floating molds or the like are eliminated.

In Embodiment 1, since distance D between needle electrodes 11a and 12a is set to the optimal value in accordance with wind velocity v at the position where the ion generation apparatus is installed, a large amount of ion generation can be obtained.

Figure 11:
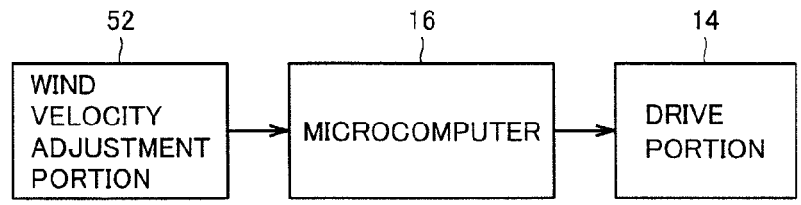
FIG. 11 is a block diagram showing a modification of Embodiment 1.

FIG. 11 is a block diagram showing a modification of Embodiment 1, which is contrasted with FIG. 6. In FIG. 11, in this modification, wind velocity sensor 15 is replaced by a wind velocity adjustment portion 52. When a user of the air cleaner sets wind velocity using wind velocity adjustment portion 52, a signal indicating the set wind velocity is output from wind velocity adjustment portion 52 to microcomputer 78. Microcomputer 16 controls a fan (not shown) in response to the output signal of wind velocity adjustment portion 52 to set wind velocity v, and controls drive portion 14 in accordance with wind velocity v to set distance D to the optimal value. Also in this modification, the same effect as that of Embodiment 1 is obtained.

[Embodiment 2]

Figure 12:
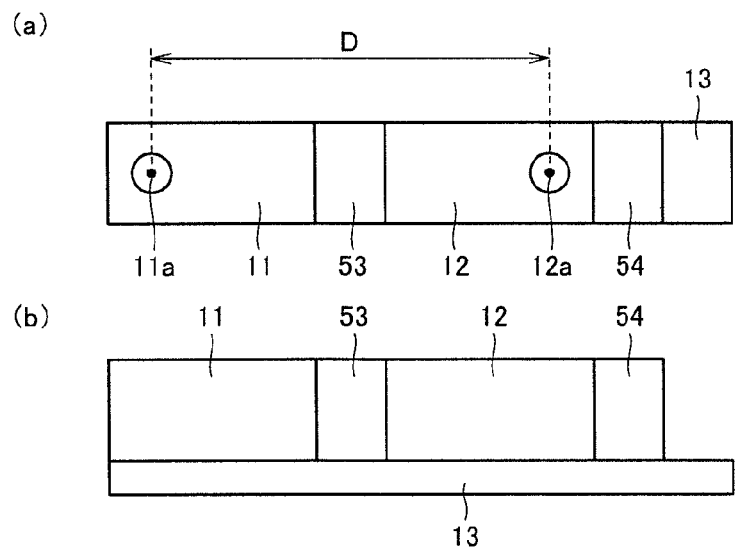
FIG. 12 is a view showing a configuration of an ion generation apparatus for an air cleaner in accordance with Embodiment 2 of the present invention.

FIG. 12(a) is a plan view showing a configuration of an ion generation apparatus for an air cleaner in accordance with Embodiment 2 of the present invention, and FIG. 12(b) is a front view thereof. In FIGS. 12(a) and 12(b), the ion generation apparatus includes negative ion generation portion 11, positive ion generation portion 12, rail 13, a spacer 53, and a stopper 54. Negative ion generation portion 11 is fixed to one end portion of rail 13. Positive ion generation portion 12 is supported by rail 13 to be movable in the length direction of rail 13.

In the air cleaner, wind velocity v at the position where the ion generation apparatus is installed is fixed. When wind velocity v is fixed, a large amount of ion generation can be obtained by fixing distance D between needle electrodes 11a and 12a to an optimal value. Thus, in the ion generation apparatus, spacer 53 for setting distance D to the optimal value is provided between ion generation portions 11 and 12, and spacer 52 and positive ion generation portion 12 are fixed by stopper 54.

In the case where wind velocity v at the position where the ion generation apparatus is installed is fixed, and there are plural types of air cleaners having different wind velocities v, plural types of spacers 53 for setting distance D to the optimal value in the respective plural types of air cleaners are prepared. In addition, in the plural types of air cleaners, ion generation portions 11 and 12, rail 13, and stopper 54 are used in common, and only spacer 53 is changed depending on the type of air cleaner. Thereby, components can be used in common in the plural types of air cleaners, which can lower the price of the apparatus.

[Embodiment 3]

Figure 13:
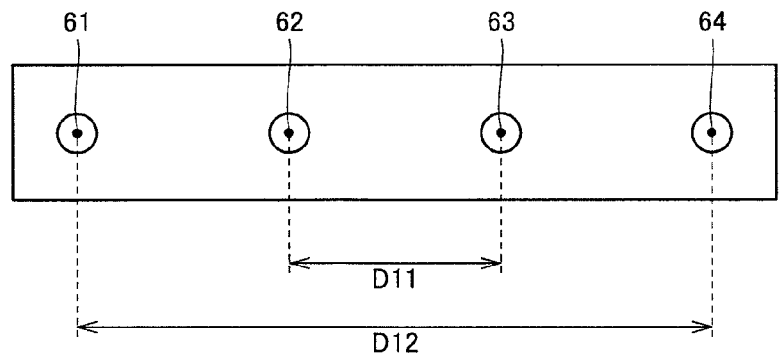
FIG. 13 is a view showing a configuration of an ion generation apparatus for an air cleaner in accordance with Embodiment 3 of the present invention.

FIG. 13 is a plan view showing a configuration of an ion generation apparatus for an air cleaner in accordance with Embodiment 3 of the present invention. In FIG. 13, the ion generation apparatus includes four needle electrodes 61 to 64 exposed on an upper surface of a rectangular solid casing.

Each of needle electrodes 61 and 63 generates negative ions, and each of needle electrodes 62 and 64 generates positive ions.

Needle electrodes 61 to 64 are placed along one straight line, and needle electrode 61 forms a pair with needle electrode 64, and needle electrode 62 forms a pair with needle electrode 63. A distance D11 between needle electrodes 62 and 63 is smaller than a distance D12 between needle electrodes 61 and 64. A distance between needle electrodes 61 and 62, a distance between needle electrodes 62 and 63, and a distance between needle electrodes 63 and 64 are substantially identical. If wind velocity v at the position where the ion generation apparatus is installed is high, ions are generated at inner two needle electrodes 62 and 63, and if wind velocity v at the position where the ion generation apparatus is installed is low, ions are generated at outer two needle electrodes 61 and 64.

Figure 14:
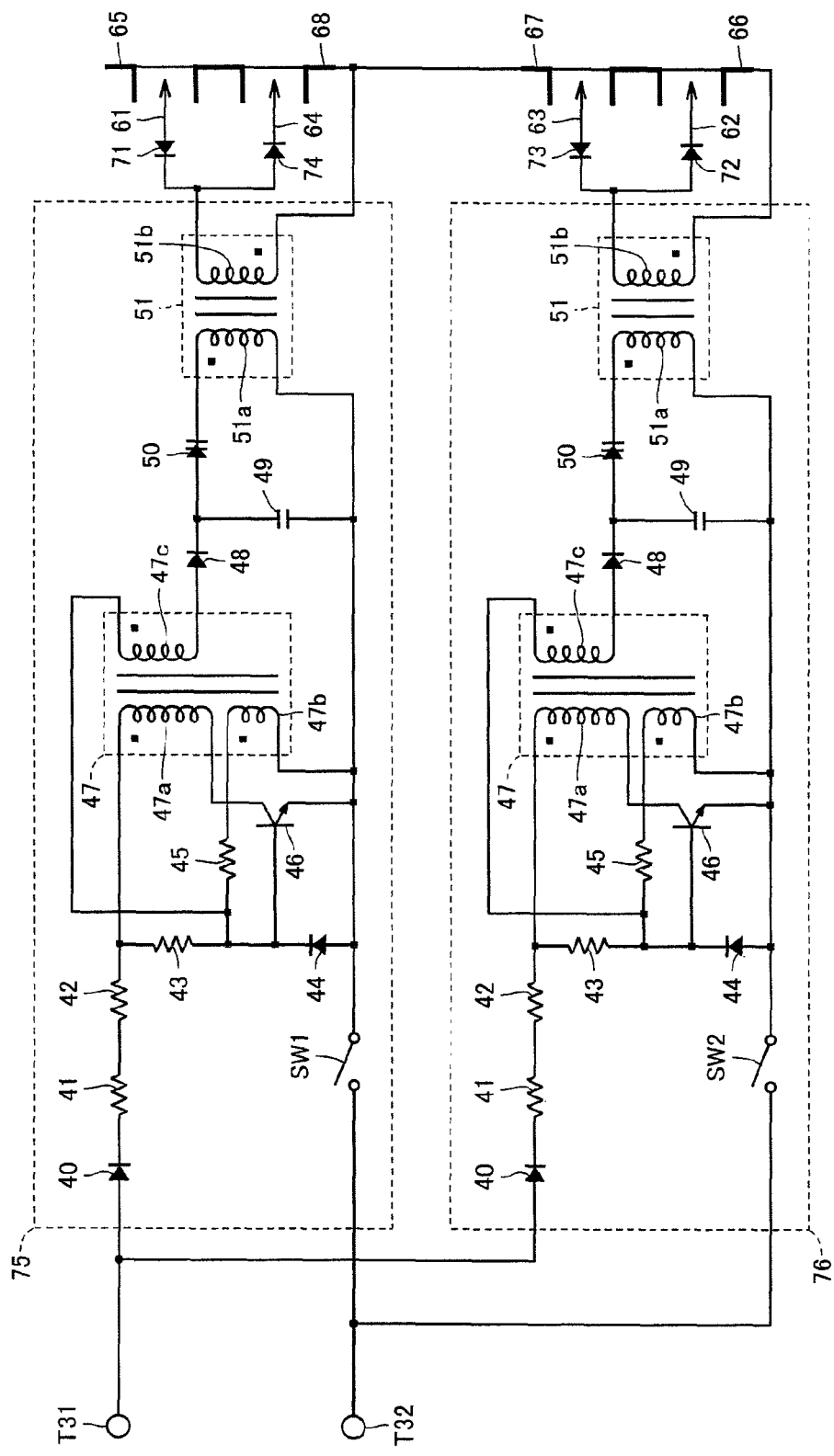
FIG. 14 is a circuit diagram showing a configuration of the ion generation apparatus shown in FIG. 13.

FIG. 14 is a circuit diagram showing a configuration of the ion generation apparatus. In FIG. 14, in addition to needle electrodes 61 to 64, the ion generation apparatus further includes induction electrodes 65 to 68, diodes 71 to 74, power supply circuits 75 and 76, a power supply terminal T31, and a ground terminal T32. Power supply circuit 75 is equivalent to power supply circuit 33 in FIG. 10 additionally provided with a switch SW1, and power supply circuit 76 is equivalent to power supply circuit 33 additionally provided with a switch SW2.

A positive terminal and a negative terminal of a DC power supply are connected to power supply terminal T31 and ground terminal T32, respectively. A DC power supply voltage (for example, +12V or +15V) is applied to power supply terminal T31, and ground terminal T32 is grounded. Switch SW1 is connected between ground terminal T32 and an anode of diode 44 in power supply circuit 75. Switch SW2 is connected between ground terminal T32 and an anode of diode 44 in power supply circuit 76.

On the other hand, tip ends of needle electrodes 61 to 64 are placed at the centers of holes in induction electrodes 65 to 68, respectively. Induction electrodes 65 to 68 are electrically connected to each other. Secondary winding 51b of pulse transformer 51 in power supply circuit 75 has one terminal connected to induction electrodes 65 to 68, and the other terminal connected to a cathode of diode 71 and an anode of diode 74. An anode of diode 71 is connected to needle electrode 61, and a cathode of diode 74 is connected to needle electrode 64.

Secondary winding 51b of pulse transformer 51 in power supply circuit 76 has one terminal connected to induction electrodes 65 to 68, and the other terminal connected to a cathode of diode 73 and an anode of diode 72. An anode of diode 73 is connected to needle electrode 63, and a cathode of diode 72 is connected to needle electrode 62.

When switch SW1 is turned on, the DC power supply voltage is supplied to power supply circuit 75, and an impulse voltage is generated in primary winding 51a of pulse transformer 51 in power supply circuit 75. When the impulse voltage is generated in primary winding 51a, positive and negative high-voltage pulses are alternately generated in an attenuating manner in secondary winding 51b. The positive high-voltage pulses are applied to needle electrode 64 via diode 74, and the negative high-voltage pulses are applied to needle electrode 61 via diode 71. Thereby, corona discharge occurs at the tip ends of needle electrodes 61 and 64, and negative ions and positive ions are generated.

When switch SW2 is turned on, the DC power supply voltage is supplied to power supply circuit 76, and an impulse voltage is generated in primary winding 51a of pulse transformer 51 in power supply circuit 76. When the impulse voltage is generated in primary winding 51a, positive and negative high-voltage pulses are alternately generated in an attenuating manner in secondary winding 51b. The positive high-voltage pulses are applied to needle electrode 62 via diode 72, and the negative high-voltage pulses are applied to needle electrode 63 via diode 73. Thereby, corona discharge occurs at the tip ends of needle electrodes 63 and 62, and negative ions and positive ions are generated.

Figure 15:
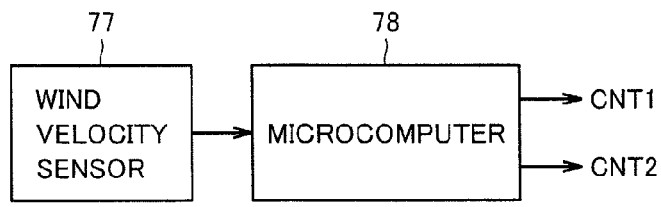
FIG. 15 is a block diagram showing a portion related to control of the ion generation apparatus shown in FIG. 13.

As shown in FIG. 15, the air cleaner further includes a wind velocity sensor 77 and a microcomputer 78. Wind velocity sensor 77 detects wind velocity v at the position where the ion generation apparatus is placed, and outputs a signal indicating a detected value. If wind velocity v is low based on the output signal of wind velocity sensor 77, microcomputer 78 sets control signals CNT1 and CNT2 to an "H" level and an "L" level, respectively. Thereby, of switches SW1 and SW2, only switch SW1 is turned on, and ions are generated at outer two needle electrodes 61 and 64.

Further, if wind velocity v is high based on the output signal of wind velocity sensor 77, microcomputer 78 sets control signals CNT1 and CNT2 to an "L" level and an "H" level, respectively. Thereby, of switches SW1 and SW2, only switch SW2 is turned on, and ions are generated at inner two needle electrodes 62 and 63.

In Embodiment 3, since distance D between the needle electrodes is set to an optimal value in accordance with wind velocity v at the position where the ion generation apparatus is installed, a large amount of ion generation can be obtained. Although inner two needle electrodes 62 and 63 are caused to discharge when wind velocity v is high in Embodiment 3, all of needle electrodes 61 to 64 may be caused to discharge. In this case, if wind velocity v is high based on the output signal of wind velocity sensor 77, microcomputer 78 sets both of control signals CNT1 and CNT2 to an "H" level. Thereby, both of switches SW1 and SW2 are turned on, and ions are generated at all of needle electrodes 61 to 64. Therefore, a larger amount of ion generation can be obtained.

Figure 16:
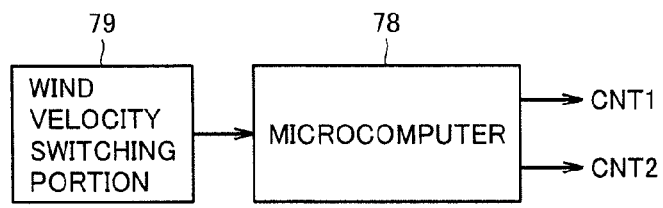
FIG. 16 is a block diagram showing a modification of Embodiment 3.

FIG. 16 is a block diagram showing a modification of Embodiment 3, which is contrasted with FIG. 15. In FIG. 16, in this modification, wind velocity sensor 77 is replaced by a wind velocity switching portion 79. When a user of the air cleaner switches wind velocity to "high" or "low" using wind velocity switching portion 79, a signal indicating "high" or "low" is output from wind velocity switching portion 79 to microcomputer 78. Microcomputer 78 controls a fan (not shown) in response to the output signal of wind velocity switching portion 79 to switch the wind velocity to "high" or "low", and generates control signals CNT1 and CNT2 in accordance with the wind velocity to set distance D to the optimal value. Also in this modification, the same effect as that of Embodiment 3 is obtained.

[Embodiment 4]

Figure 17:
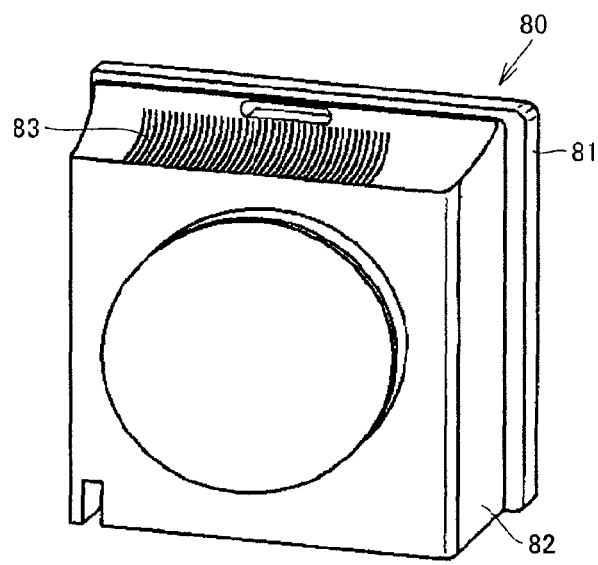
FIG. 17 is a perspective view schematically showing a configuration of an air cleaner in accordance with Embodiment 4 of the present invention.
Figure 18:
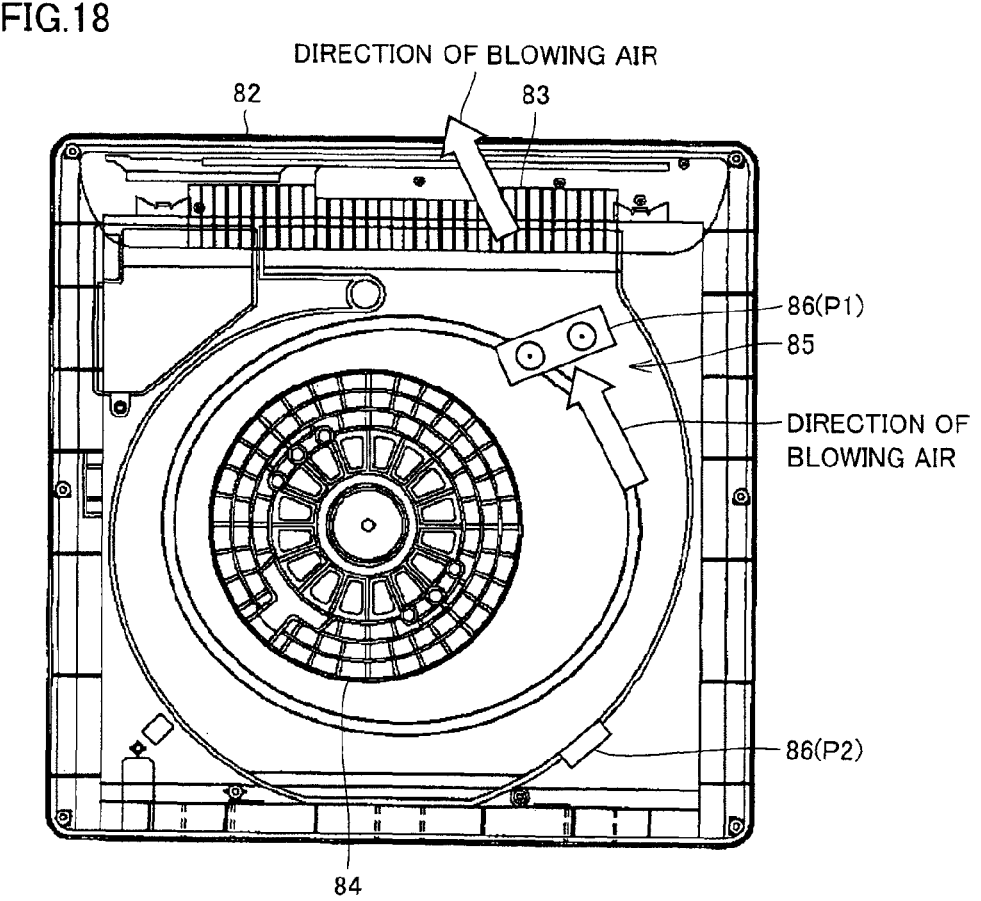
FIG. 18 is an exploded view of the air cleaner showing a manner in which an ion generation apparatus is placed in the air cleaner shown in FIG. 16.
Figure 19:
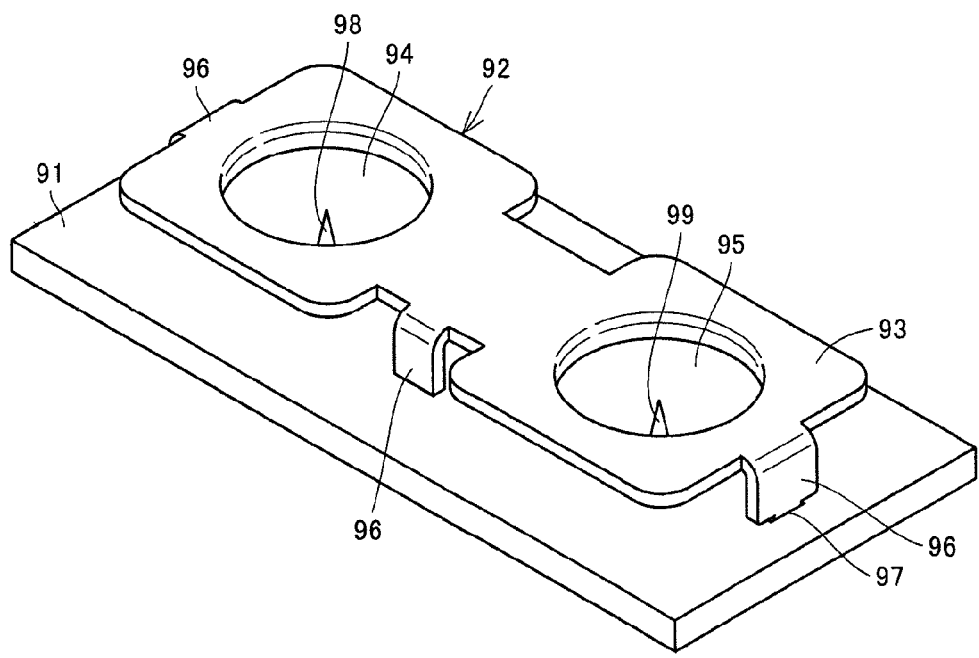
FIG. 19 is a view showing a main portion of a conventional ion generation apparatus.

FIG. 17 is a perspective view schematically showing a configuration of an air cleaner 80 including the ion generation apparatus described in any of Embodiments 1 to 3. FIG. 18 is an exploded view of air cleaner 80 showing a manner in which the ion generation apparatus is placed in air cleaner 80 shown in FIG. 17.

In FIGS. 17 and 18, air cleaner 80 includes a front panel 81 and a main body 82. An outlet 83 is provided in an upper back portion of main body 82, and purified air containing ions is supplied from outlet 83 into a room. An air inlet 84 is formed at the center of main body 82. Air taken in through air inlet 84 is purified by passing through a filter not shown. The purified air is supplied from outlet 83 to the outside, through a fan casing 85. An ion generation apparatus 86 described in any of Embodiments 1 to 3 is attached to a portion of fan casing 85 forming a passage for the purified air. Ion generation apparatus 86 is placed to be capable of emitting ions generated at two needle electrodes into air flow described above. For example, ion generation apparatus 86 may be placed at a position in the passage for the air, such as a position P1 relatively close to outlet 83 or a position P2 relatively far from the same. By allowing the air to pass through ion generation apparatus 86 as described above, air cleaner 80 can have an ion generation function of supplying ions together with the purified air from outlet 83 to the outside.

In addition to air cleaner 80, the ion generation apparatus of the present embodiment can be mounted to an ion generator (a circulator equipped with an ion generation apparatus), an air-conditioner, a refrigerator, a sweeper, a humidifier, a dehumidifier, a washing and drying machine, a washing machine, an electric fan heater, and the like, and can be mounted to any electric equipment having an air blowing portion for sending ions on an air flow.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: negative ion generation apparatus, 1a, 2a, 11a, 12a, 61 to 64, 98, 99: needle electrode, 2: positive ion generation apparatus, 3: ion counter, 4: duct, 11: negative ion generation portion, 12: positive ion generation portion, 13: rail, 14: drive portion, 15, 77: wind velocity sensor, 16, 78: microcomputer, 20, 30: substrate, 21, 31, 65 to 68, 92: induction electrode, 22, 32, 40, 44, 48, 71 to 74: diode, 23, 93: flat plate portion, 24, 94, 95: through hole, 25: bent portion, 26: leg portion, 27, 96: support portion, 28, 97: substrate insertion portion, EL: electrode, T1, T2, T11, T12: terminal, T21, T31: power supply terminal, T22, T32: ground terminal, 33, 34, 75, 76: power supply circuit, 41 to 43, 45: resistance element, 46: NPN bipolar transistor, 47, 51: pulse transformer, 47a, 51a: primary winding, 47b: base winding, 47c, 51b: secondary winding, 49: capacitor, 50: diode thyristor, 52: wind velocity adjustment portion, 53: spacer, 54: stopper, 79: wind velocity switching portion, 80: air cleaner, 81: front panel, 82: main body, 83: outlet, 84: air inlet, 85: fan casing, 86: ion generation apparatus.

The invention claimed is:

1. An ion generation method generating positive ions and negative ions, comprising:
providing a first ion generation portion generating positive ions and a second ion generation portion generating negative ions; and
adjusting a distance between said first and second ion generation portions to adjust an amount of ion generation;
wherein the distance between said first and second ion generation portions is adjusted in accordance with wind velocity at positions where said first and second ion generations portions are installed.

2. An ion generation apparatus generating positive ions and negative ions, comprising:
a first ion generation portion generating positive ions; a second ion generation portion generating negative ions; and
a first adjustment portion adjusting a distance between said first and second ion generation portions to adjust an amount of ion generation;
wherein said first adjustment portion adjusts the distance between said first and second ion generation portions in accordance with wind velocity at positions where said first and second ion generation portions are installed.

3. The ion generation apparatus according to claim 2, further comprising a detection portion detecting the wind velocity at the positions where said first and second ion generation portions are installed,
wherein said first adjustment portion adjusts the distance between said first and second ion generation portions based on a detection result of said detection portion.

4. The ion generation apparatus according to claim 2, further comprising a second adjustment portion adjusting the wind velocity at the positions where said first and second ion generation portions are installed,
wherein said first adjustment portion adjusts the distance between said first and second ion generation portions in response to a signal indicating said wind velocity output from said second adjustment portion.

5. The ion generation apparatus according to claim 2, wherein
said first ion generation portion includes
a first induction electrode having a first hole,
a first needle electrode having a tip end placed at a central portion of said first hole, and
a first power supply circuit applying a positive voltage between said first needle electrode and said first induction electrode,
said second ion generation portion includes
a second induction electrode having a second hole,
a second needle electrode having a tip end placed at a central portion of said second hole, and
a second power supply circuit applying a negative voltage between said second needle electrode and said second induction electrode, and
the distance between said first and second ion generation portions is a distance between said first and second needle electrodes.

6. Electric equipment, comprising:
the ion generation apparatus according to claim 2; and
an air blowing portion for delivering positive ions and negative ions generated at said ion generation apparatus.

7. An ion generation apparatus generating positive ions and negative ions, comprising:
a first ion generation portion generating positive ions; and
a second ion generation portion generating negative ions,
wherein a distance between said first and second ion generation portions is adjustable;
wherein the distance between said first and second ion generation portions is set to a prescribed value in accordance with wind velocity at positions where said first and second ion generation portions are installed.

8. The ion generation apparatus according to claim 7, wherein
said first ion generation portion includes
a first induction electrode having a first hole,
a first needle electrode having a tip end placed at a central portion of said first hole, and
a first power supply circuit applying a positive voltage between said first needle electrode and said first induction electrode,
said second ion generation portion includes
a second induction electrode having a second hole,
a second needle electrode having a tip end placed at a central portion of said second hole, and a second power supply circuit applying a negative voltage between said second needle electrode and said second induction electrode, and the distance between said first and second ion generation portions is a distance between said first and second needle electrodes.

9. Electric equipment, comprising:

the ion generation apparatus according to claim 7; and an air blowing portion for delivering positive ions and negative ions generated at said ion generation apparatus.

10. An ion generation apparatus generating positive ions and negative ions, comprising:

plural sets each including a first ion generation portion generating positive ions and a second ion generation portion generating negative ions, a distance between the first and second ion generation portions in each set being different from a distance between the first and second ion generation portions in another set; and a control portion selecting one, two, or more sets of said plural sets of the first and second ion generation portions based on wind velocity at positions where said first and second ion generation portions are installed, and activating the selected set of the first and second ion generation portions.

11. The ion generation apparatus according to claim 10, further comprising a detection portion detecting the wind velocity at the positions where said first and second ion generation portions are installed, wherein said control portion selects one, two, or more sets of said plural sets of the first and second ion generation portions based on a detection result of said detection portion.

12. The ion generation apparatus according to claim 10, further comprising a switching portion switching the wind velocity at the positions where said first and second ion generation portions are installed, in plural stages, wherein said control portion selects one, two, or more sets of said plural sets of the first and second ion generation portions in response to a signal indicating a stage of said wind velocity output from said switching portion.

13. The ion generation apparatus according to claim 10, wherein said plural sets of the first and second ion generation portions are placed along one straight line, and each set of the first and second ion generation portions is placed between a set of the first and second ion generation portions having a distance therebetween larger than that of the each set.

14. The ion generation apparatus according to claim 13, wherein said first and second ion generation portions are alternately placed, and said second ion generation portion is placed adjacent to each first ion generation portion, and a distance between the adjacent first and second ion generation portions is substantially identical to a distance between the adjacent other first and second ion generation portions.

15. The ion generation apparatus according to claim 10, wherein said first ion generation portion includes a first induction electrode having a first hole, a first needle electrode having a tip end placed at a central portion of said first hole, and a first power supply circuit applying a positive voltage between said first needle electrode and said first induction electrode, said second ion generation portion includes a second induction electrode having a second hole, a second needle electrode having a tip end placed at a central portion of said second hole, and a second power supply circuit applying a negative voltage between said second needle electrode and said second induction electrode, and the distance between said first and second ion generation portions is a distance between said first and second needle electrodes.

16. Electric equipment, comprising:

the ion generation apparatus according to claim 10; and an air blowing portion for delivering positive ions and negative ions generated at said ion generation apparatus.

* * * * *